Oct. 18, 1932.          B. B. FORTNEY          1,883,361
                           HEADLIGHT
                  Original Filed Jan. 29, 1929
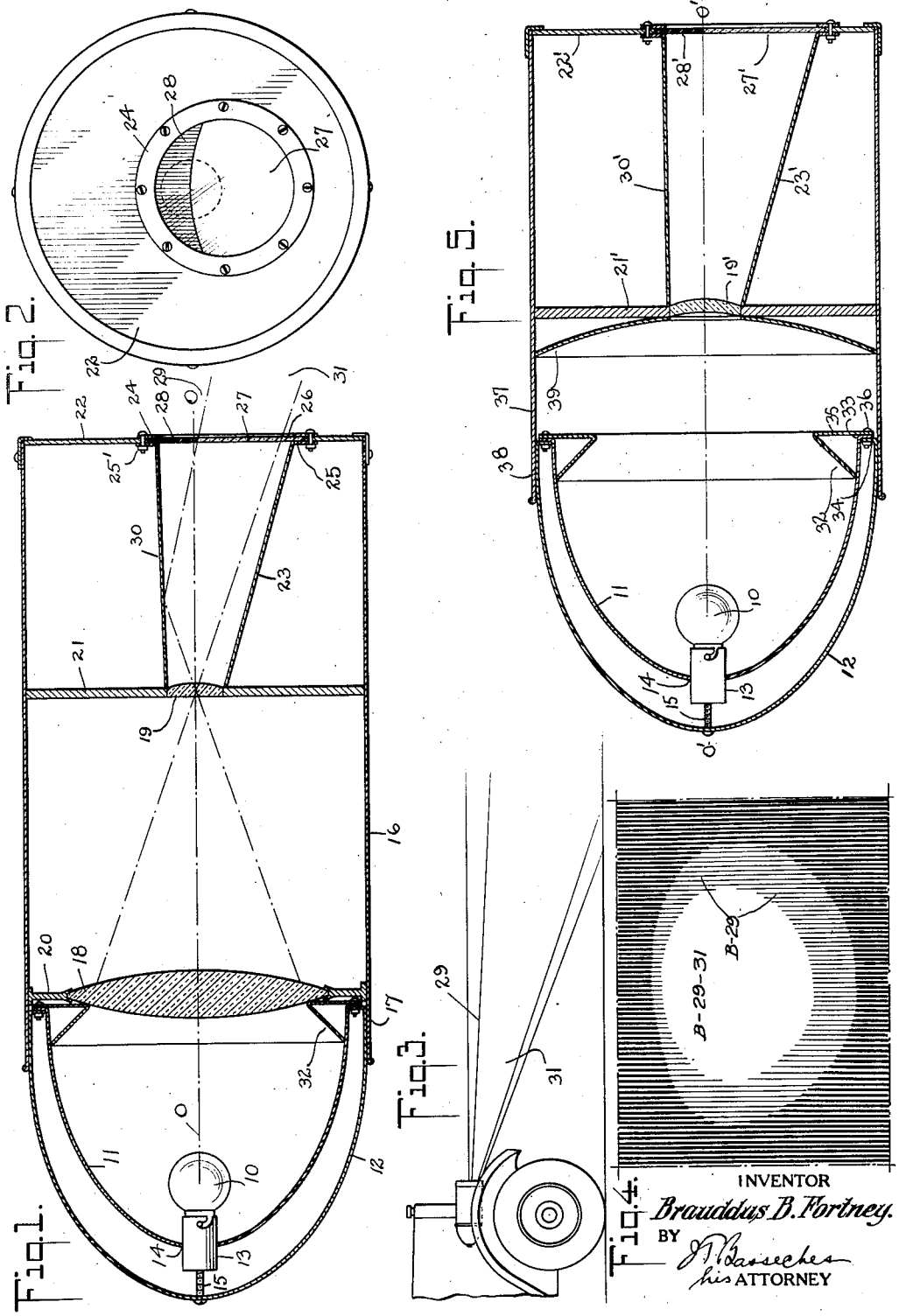
INVENTOR
Brauddus B. Fortney.
BY
his ATTORNEY Patented Oct. 18, 1932

1,883,361

UNITED STATES PATENT OFFICE

BRAUDDUS BROCK FORTNEY, OF LOUISVILLE, KENTUCKY, ASSIGNOR TO AMERICAN SAFETY HEADLIGHT CORPORATION, A CORPORATION OF DELAWARE

HEADLIGHT

Application filed January 29, 1929, Serial No. 335,875. Renewed June 16, 1932.

My invention relates to automobile headlights.

It is an object of my invention to provide an automobile headlamp which will fill all present requirements for illumination of the road, for spread and distance and avoid the objection of glare to approaching observers.

The present traffic law standards of headlight illumination have restricted the incandescent lamp or light source as one having a mean candlepower of 21, this low mean candlepower being so restricted due to the glare obtained in utilizing open face reflectors which are intended to salvage the light from the lamp from about a spheroid of reference. Reflectors of this general character include parabolic reflectors or the like which are intended to be associated with light spreading devices, such as prismatic lenses, to distort an otherwise cylindrical beam to distant points upon the roadway. Not only are these devices objectionable in that they operate within limited fields of candlepower, require expensive lenses and carefully adjusted lamps for spreading or distorting the cylindrical beam, but they project a beam of light which is uncontrolled, produces side scattering and frontal glare. The shortcomings, therefore, of present day types of headlights are restricted, low and non-uniform illumination and the inherent blinding effects of frontal and side glare.

It is therefore an object of my invention to provide a headlight which has substantially no limit in illuminating capacity in that a source of light may be used of any desired candlepower and project the same upon the roadway for intense illumination along controlled paths below levels which will in any way interfere or blind an approaching observer, the device including condensing and reprojecting means for limiting the beam accurately below predetermined levels. It is a further object of my invention to provide a headlight which may have a light source of any desired intensity and project the same in a controlled beam below predetermined levels by an accurately and uniformly controlled reprojecting and focusing device, the visible outlet of the condensed beam being positioned to in no way be objectionable to the eye of an approaching driver on the road and having luminosity to be tolerable, with no glaring or blinding properties. It is contemplated by my invention to so uniformly condense, focus and reproject the light beam upon a roadway, either a highway or railway right of way, to obtain maximum intensity of illumination at great distances and to be free from uncontrolled side fringes of light tending to produce glare and blindness.

Other objects of my invention reside in the provision of a headlight which includes a source of condensed light substantially invisible normally whereby an intense source of light may be utilized and one which will reproject a beam upon the roadway and distant objects with intense illumination but free from any tendency to prevent accommodation of the eye to the more distantly illuminated objects. Other objects of my invention include the provision of a headlight which is simple and inexpensive to manufacture, efficient in illumination and safe in that it is free from glare or blinding characteristics.

A still further object of my invention resides in providing a headlight for roadways in which the light is projected along the optical axis of the projecting device, characterized by utilizing the light rays below the optical axis from a condensed and controlled focal point and reflecting substantially all the projected light above the optical axis, the projected and reflected portions serving to illuminate the object upon which it impinges in a manner to cause no preferential accommodation of the eye to nearby or distant objects.

Still further objects of my invention reside in the provision of a headlight whereby side fringes and glare are substantially avoided and whereby maximum light is transmitted upon the roadway, characterized by reprojecting and focusing the rays of light from the source through a light conducting, controlling and reflecting conduit, preferably conical, whereby the light source will be substantially invisible except at points below that normally assumed by the eye of an observer driving in an approaching vehicle whereby intense illumination, without glare, may be utilized.

To attain these objects and such further objects as may appear herein or be hereinafter pointed out, I make reference to the accompanying drawing forming a part hereof, in which—

Figure 1 is a sectional view in side elevation of my device;

Figure 2 is an end elevation of Figure 1;

Figure 3 is a fragmentary view showing my device assembled in association with an automobile;

Figure 4 illustrates the illumination outline of beam made in accordance with my invention;

Figure 5 is a sectional view in side elevation of another embodiment of my invention.

Making reference to the drawing, it will be observed that a headlight in accordance with my invention comprises a light source 10, a primary reflector 11, serving to project a beam to a focus on the optical axis O—O. In the form illustrated, the reflector 11 may be an ellipsoidal reflector or a distorted paraboloidal reflector, which will serve to uniformly concentrate the light at a focus on the optical axis relatively near the light source 10. It is preferred that the reflector 11 be an ellipsoidal reflector, and for this purpose the source of light 10 is positioned with the filament adjacent the focus of the ellipsoid. A rear housing 12 serves to mount the reflector and the light source 10 is provided with a socket 13 passing through an orifice 14 in the reflector and adjustable relatively thereto by the focusing screw 15. Mounted forwardly of the reflector and preferably attached to the housing 12, I provide a cylindrical sleeve 16, engaging the housing 12 at 17, in overlapping relation. The sleeve 16 serves to mount a light ray condenser 18 and a focal lens 19, which may be a plano-convex, by the diaphragms or partitions 20 and 21, respectively. The partition 21 and the forward end plate 22 serve to mount a control reflecting conduit 23, preferably of conical outline. The dimensions of this cone are so chosen that it diverges at a rate corresponding to the spread of the beam desired. The control conduit 23 is concentrically positioned about the optical axis adjacent the focal lens 19 but is eccentric with the optical axis at the outer end 24.

At the outer end I may provide a frame 25, held to the partition 22 by the nut and bolt 25′, in which there is mounted a plate 26 having a clear portion 27, substantially below the optical axis O—O and an opaque or translucent portion 28 above the optical axis. This portion 28 is preferably substantially crescent-shaped for reasons which will appear as this description proceeds.

By the construction shown, particularly where I provide the ellipsoidal reflector 11, a major portion of the rays directly projected through the condensing lens 18 and reflected from the reflector 11 will be converged substantially within the focal lens 19 and are caused to emerge in a controlled beam 29. It will be observed that substantially all the light below the optical axis will be directly projected below the optical axis without change or reflection, through the lens 19 as the surface of the conical conduit 23 is so chosen as to angular displacement and position below the optical axis O—O as to be substantially parallel to the outermost spread of the beam. Thus, substantially no reflection will be obtained from the surface of the conduit 23 below the optical axis. The beam focused above the optical axis may be screened off entirely by the crescent-shaped portion 28. The side 30 of the cone 23 above the optical axis is formed interiorly thereof with a highly polished or mirrored reflecting surface. The slant of this portion 30 is so chosen that the beam above the optical axis will be reflected downwardly into a beam 31 adjacent the beam 29 or within the zone thereof, forming overlapping portions and adjacent portions.

The character of the combined beams 29 and 31 may be understood by reference to Figure 4 and the chart therein illustrated, in which B—31 is the outline as obtained from illumination by the beam 31 solely and the portion B—29—31 is the portion illuminated jointly by the beams 29 and 31. Thus, reinforcement is obtained for more distant objects, to intensify the illumination at a distance and sufficient illumination at points nearer the headlight. The combined effects of the beam will permit of proper accommodation of the eye for objects at a distance where there is illumination inversely as the square of the distance, giving, however, proper illumination to objects near the headlight.

It will be further observed that the only portion of the reflector 23 visible to an approaching observer from the frontal aspect of the reflector will be that below the optical axis. As no reflection takes place from this portion, glare will be eliminated entirely, the beam 29 and the reflected beam 31 emerging from the conical conduit at portions at least parallel to the lateral side of the conical member below the optical axis. To facilitate visibility above the optical axis, the screen 28 may be made translucent and it is preferred that this portion be made of amber colored glass. By this arrangement, a small fraction of the rays which would be directly projected above the optical axis and those which may emerge by reflection above the optical axis are made tolerably visible above a predetermined height, such as the optical axis of the projector, to illuminate the front of a vehicle and adjacent objects.

In the embodiment shown in Figure 1 it will be observed that a small percentage of the rays are not directly projected or reflected from the reflector 11 due to the mounting means necessary for retaining the condenser lens 18 and due to aberration of light from the source which in actual operation is more than a mere point source. To correctly focus substantially the rays of light within the focal lens 19 into a beam having the desired divergence and in order to increase the efficiency of the reflector, I may include aberration reflectors 32 immediately in front of the condenser lens. This reflector preferably includes an annular reflective surface directed towards the light source and will serve to reflect back upon the reflector 11 that portion of the beam of light which is not directly projected through the condenser lens 18 or reflected from the primary reflector 11. Light striking the annular aberration reflector 32 will be projected by re-reflection. In this manner I may substantially project all the light from the light source except that portion taken up by the base 13 of the lamp. In this form, not only is there a complete salvaging of the light rays as the rays are oscillated within the reflector before they emerge in predeterminedly defined paths.

In Figures 1 and 2, I have described a headlight in which a predeterminedly divergent beam focused below levels likely to undesirably affect an approaching observer is accomplished by a focusing reflector and condenser. I may eliminate the condenser 18 and thereby also shorten the entire length of the housing 16 by so forming the reflector 11 as to directly, of its own accord, properly focus the beam of light within the focal lens.

In Figure 5 the reflector 11 is mounted within the housing 12, provided with a bulb socket 13, passing through an orifice 14 capable of relative adjustment by the focus adjusting screw 15. The open end of the reflector 11 and the housing 12 are provided with outwardly and inwardly turned flanges 33 and 34, respectively, to which are also exteriorly attached the outwardly directed flange 35 of the aberration reflector 32, the parts being held in assembled relation by the bolts 36. Over the outer end of the housing I may position in sliding relation a cylindrical housing 37, engaging the housing 12 at 38 by frictional and screw engagement. The housing 37 is provided with a partition 21' and a forward end plate 22' as in the embodiment illustrated in Figure 1, serving to hold and mount the conduit 23', preferably of the same general form and shape as in the embodiment shown in Figure 1, disposed with the orifice connecting with the partition 21' concentric with the optical axis O'—O' and eccentrically at the front plate 22'. Mounted within the partition 21' I provide a concavo-convex focal lens 19'. The position of this concavo-convex focal lens along the optical axis corresponds to the second focal point of the rays converged and emanated from the reflector 11. In this embodiment the re-reflector 11 may be an ellipsoidal reflector with the filament of the bulb 10 at the primary focus and the focal lens 19' at the secondary focus. It will be understood, however, that the reflector need not be an ellipsoidal reflector but may be a parabolic reflector which is spun so that the surface of revolution is generated by a parabolic template which has the axis of reference angularly disposed to the optical axis, as will be readily understood. In this manner the rays reflected from the primary reflector 11 will be converged into the focal lens 19', and reprojected upon the roadway through the secondary conic reflector.

To take care of the projected light adjacent the rim of the reflector 11 and to correct any dispersion of light due to the fact that I use more than a mere point source of light, I may include the aberration reflector 32, as previously described. It will be observed, further, that light will be projected between the outer end of the aberration reflector 32 and the periphery of the focal lens 19' in a conical beam diverging outwardly. To salvage this portion of light I may further include a concentrating reflector 39. This reflector is so formed that light impinging thereon is concentrated upon the reflector 11 so that by double or triple reflection, the beams will emanate from the reflector 11 as if they were directly projected from the original source, thence outwardly into the focal lens 19'. The aberration reflector 32 and the concentrating reflector 39 may each be substantially concentric with the mean center of the filament of the light source 10 so that the re-reflected rays from the reflector 11 will be concentrated within the focal lens 19' substantially as if they emanated directly from the light source. The shape and form of the focal lens 19' and reflecting conduit are so chosen as to diverge the rays of light into a beam substantially the form described in connection with the embodiment shown in Figure 1, the portion of the beam of light below the optical axis O'—O' being of the character to direct light at a great distance in front of the headlight and to accurately control the same below the optical axis. The portion of the conduit above the optical axis, as 30', has interiorly formed thereon a reflective surface which will serve to direct a beam adjacent or within the zone of the beam projected and emerging from the conical conduit below the optical axis.

At the frontal portion of the end plate 22' there is mounted as in the previous form, a transparent plate 27' having a screen 28', either entirely opaque or translucent, preferably colored an agreeable color, such as amber. The device otherwise functions as in the preceding embodiment.

To project a beam of light of intense illuminating properties characterized by being able to use any desired candlepower lamp 10 and further intensified by utilizing substantially the entire spherical angle of the light source; to control projection through the small focal lens, and reflecting conduit particularly in relation to the surface of the conduit below the optical axis whereby the beam is substantially parallel to the surfaces 23 and 23', which will result in no light being directly reflected scattered upwardly or to the side of the headlight to cause a blinding glare. Furthermore, projecting through the relatively small focal lens positioned at a substantial distance back of the clear portion 27, the small opaque or amber colored portion 28 or 28' will effectively hide the bright light source from the view of an approaching observer. This factor further permits the utilization of as high a candlepower light source as may be desired to ensure proper illumination at a great distance, illumination at points closer to the headlight, assuring accommodation of the eye to the more distantly illuminated objects, all by controlled projection without any frontal glare or side scattering of light.

In all, I have provided a headlight which is safe in so far as providing a high amount of illumination for night driving without danger of blinding an approaching observer of such projected light.

Having thus described my invention and illustrated its use, what I claim as new and desire to secure by Letters Patent, is—

1. In a headlight having the combination which includes a condensing and refracting system arranged to converge the light from a source to a focal area within the headlight, of a conically formed secondary opaque reflector conduit having its small end concentric with the optical axis of said system adjacent the focal area of said light and its forward end eccentrically disposed with the optical axis to extend below the same, said conduit having the portion of the conical conduit disposed above the optical axis interiorly provided with a mirrored reflective surface, a lens placed at the inner end of the conduit, a transparency at the outer end of said conduit, said transparency comprising a translucent material for a portion of its upper section.

2. In a headlight, the combination which comprises a housing, a condensing and refractive light system arranged to converge the light from the source to a focal area within the housing of said headlight, a conically formed secondary opaque reflector conduit, having its small end substantially concentric with the optical axis of said system adjacent the focal area of said light and its forward end substantially eccentrically disposed with the optical axis to extend below the same, opaque partitions for supporting said conduit adjacent each end thereof, said conduit having the portion of the conical conduit disposed above the optical axis interiorly provided with a mirrored reflective surface, a transparency at the outer end of said conduit, the outer partition supporting the conduit serving to shield all rays except those projected through the conduit, said transparency comprising a translucent material for a portion of its upper section.

3. In a headlight, a housing which includes in combination a condensing and refractive system arranged to converge the light from a source to a focal area within the headlight, a conically formed secondary reflector conduit having its small end concentric with the optical axis of said system, adjacent the focal area of said light, and its forward end eccentrically disposed with the optical axis to extend below the same, said conduit having the portion of the conical conduit disposed above the optical axis interiorly provided with a mirrored reflective surface, a lens placed adjacent the inner end of the conduit, an opaque partition for supporting the inner lens within said housing and a transparency at the outer end of said conduit, said transparency comprising a translucent material for a portion of its upper section.

In witness whereof I have hereunto signed my name this 24 day of Nov., 1928.

BRAUDDUS BROCK FORTNEY.